Feb. 15, 1938. O. E. KELLUM 2,108,287
MEANS FOR CHECKING AND RECORDING EGG PRODUCTION OF HENS
Filed Oct. 3, 1933
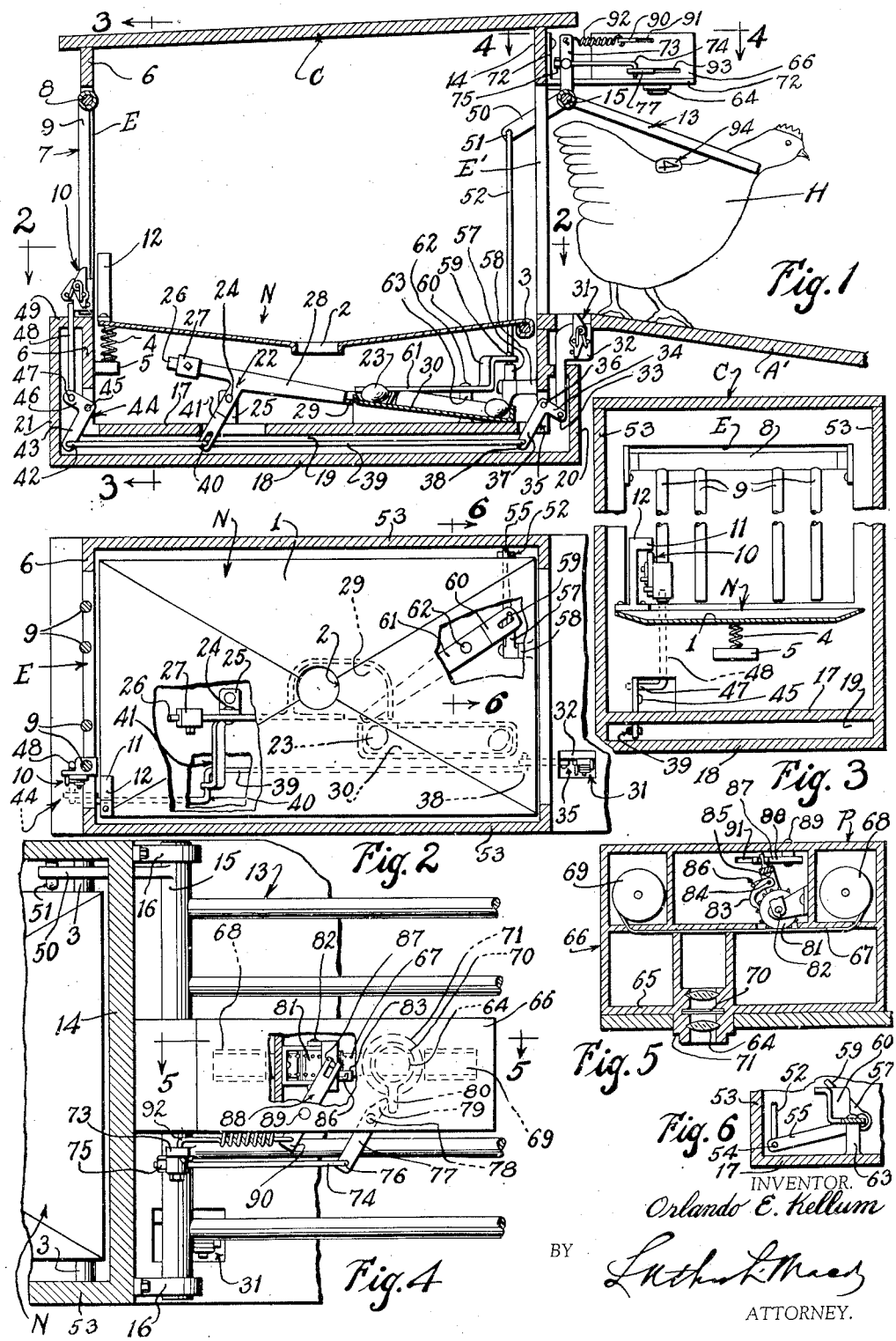
INVENTOR.
Orlando E. Kellum
BY
ATTORNEY.

Patented Feb. 15, 1938

2,108,287

UNITED STATES PATENT OFFICE 2,108,287

MEANS FOR CHECKING AND RECORDING EGG PRODUCTION OF HENS

Orlando E. Kellum, Moreno, Calif.

Application October 3, 1933, Serial No. 691,962

10 Claims. (Cl. 119—47)

This invention comprehends the provision of means adapted to be installed in, about or in connection with poultry coops or nests or the premises adjacent thereto, for regulating the ingress and egress of hens to and from the nests, together with means operatively positioned at the points of ingress or egress and controlled by the passage of the hens or at the nests for photographically recording on a sensitized film or plate distinctive and separate letters, characters, or symbols affixed in a suitable manner to the bodies of the hens so that as they pass to or from the nests the production of the hens may be separately or collectively recorded, checked and compared.

The invention further contemplates the provision of photographic means arranged at the individual nests so that the production of pedigreed hens may be separately checked and recorded in such a manner that the eggs produced by such hens may be identified with the particular hens.

Thus the principal object of this invention is to provide means for accurately checking and recording the production of hens in a poultry yard so that the unproductive hens may be separated from the productive hens.

In cases where the egg production records of certain hens are kept, a separate photographic unit is arranged, preferably at the exit from each nest, and a separate entrance is provided to each nest. The entrances to the nests in such cases are free of access and are automatically closed, upon the entrance of a hen to a nest, against the entrance of a second hen, and the exit from the nest is likewise locked against egress until an egg is laid, the deposit of the egg in the nest serving to unlock the exit, and the ensuing departure of the hen from the nest serving to unlock the entrance. When a hen, however, is on a nest the hen may freely exit through the entrance gate or door in case no egg is laid.

The photographic unit is mounted adjacent to and is operatively connected with the exit gate or door so that as a hen passes therethrough the shutter of the photograpic unit or camera will be operated so as to expose a film carried thereby to a number or designating character on the back or side of the hen. The movement of the exit gate also serves to advance the film at each operation so that an unexposed portion thereof is in position for each ensuing operation.

In the consideration of this invention other objects will appear as the description progresses.

In the accompanying drawings I have shown a preferred form of invention with certain minor alterations and modifications, in which Fig. 1 is a longitudinal section, in elevation of a nest embodying my improvements;

Fig. 2 is a sectional plan of the same on line 2—2 of Fig. 1;

Fig. 3 is a transverse section on line 3—3 of Fig. 1;

Fig. 4 is a sectional plan on line 4—4 of Fig. 1;

Fig. 5 is a sectional elevation on line 5—5 of Fig. 4;

Fig. 6 is a fragmentary section on line 6—6 of Fig. 2.

In the form of invention disclosed the individual nests, as at N, are arranged within coops C, which are provided with individual entrances E on the backs and individual exits E' at the fronts, and are provided with ramps or approaches A leading from the ground or from a common supporting surface upwardly to the entrances and exits. The nests N are preferably formed of sheet metal and are provided with slightly concave beds 1 each with a central outlet 2 in the bottom thereof depressed substantially below the level of the margin of the bed, and of a size that eggs of maximum size may be discharged therethrough.

Each of the nests N is pivotally mounted at one end on a transverse rod 3, and the opposite end thereof is resiliently held on a spring or springs 4, which are seated upon a lug or lugs 5 extended inwardly from the rear wall 6 so that the weight of a hen on a nest will compress the springs 4 for the purpose of locking the entrance gate to the nest, as hereinafter described.

The entrance gate 7 for each nest is pivotally mounted at the top on a bar 8 within the opening E, and has a plurality of rods 9, 9 etc., depending from said bar. The rods 9 are so spaced that the head of a hen may be inserted between two of the rods so that the hen may pass through the opening E, and in so passing will swing the gate 7 inwardly. The gate 7 is provided with a spring-held latch 10 which is normally disposed below and clears a portion 11 of a bracket 12 secured to the upper side and rear end of the nest bed 1. Said latch is so positioned with respect to the portion 11 of bracket 12 and is so mounted on one of the rods 9 of the gate 7 (see Fig. 3), that when the nest N is in uppermost position, as shown in Fig. 1, the latch 10 will clear said portion 11 and permit the free opening of the gate 7 inwardly. When the nest N is depressed, however, by the weight of a hen thereon, the member 12 is lowered into position so that the portion 11 thereof will be disposed opposite the latch 10, thereby preventing the opening of the gate 7 inwardly, but permitting the opening thereof outwardly.

The exit opening E' is normally closed by a gate 13 substantially similar to the gate 7 which is mounted externally of the front wall 14 of the coop C on a horizontal rod 15 which may be supported in a pair of brackets, as at 16.

Preferably the coops C are formed with a false bottom 17 and a bottom 18 providing a narrow space 19 therebetween, and supplemental front and rear walls 20 and 21 spaced from the main front and rear walls 14 and 6, respectively, so as to provide space at the ends and bottom of the coop within which to mount mechanism for controlling the ingress and egress of hens to and from the nest, and means for connecting a photographic unit therewith, as illustrated in Fig. 1.

Below each of the nests N I provide a receiver 22 for the eggs 23, which is pivotally mounted at 24 on a bracket 25 attached to the bottom 17. Said receiver has a rearwardly extended arm 26 which carries a counterbalancing weight 27 and a forwardly extending arm 28 which is provided at its extremity with a pocket 29. Said receiver 22 is normally held by means of the weight 27 so that the pocket 29 thereof will be disposed slightly beneath and forwardly of the outlet 2 of the nest in order that each of the eggs 23 as it is deposited in the nest will roll from the outlet 2 into the pocket 29 of the receiver, and the weight of the egg will over-balance the weight 27 and cause the forward arm 28 of the receiver to move downwardly into the position shown in Fig. 1.

When so operated and positioned the receiver pocket 29 is adjacent a slightly inclined channeled member 30 which is only wide enough to accommodate one row of eggs. The pocket 29 is adapted to retain an egg 23 therein until the exit gate 13 is opened by the passage of a hen outwardly therethrough, as hereinafter described.

When the eggs are thus removed from the receiver 22 the weight 27 is effective for restoring the receiver to its normally uppermost position in order to receive another egg from the nest outlet 2. The exit gate 13 is normally locked against egress from the nest by means of a spring held latch 31 which is carried on the upper end of a bar 32 at the front of the nest. Said bar is pivotally connected at 33 to an arm 34 of a bell crank 35 which is pivoted at 36 on the front wall 14 of the coop.

Said bell crank 35 has an arm 37 which is pivotally connected at 38 with a rod 39 extended longitudinally through the passage 19 of the coop and connected at 40 with a depending arm 41 from the receiver 22. Thus the depression and operation of the receiver 22 by the weight of an egg, as at 23, thereon, serves to move the rod 39 rearwardly and to correspondingly move rod 32 and latch 31 downwardly so that said latch will disengage and permit the opening of the exit gate 13 whenever an egg is laid in the nest N, thereby permitting a hen, as at H, to exit through the opening E'.

At the same time the operation of receiver 22 as described serves to prevent the exit of the hen through the entrance gate E by reason of the following connections: Rod 39 is extended rearwardly to and is connected at 42 with a depending arm 43 of a bell crank 44 which is pivotally mounted at 45 on the rear wall 6 of the coop. Said bell crank has an arm 46 which is connected at 47 with a vertical rod 48 adapted to be projected upwardly through the floor 49 of the coop beyond the bottom of the gate 7 so as to engage a suitable portion of and prevent the opening of said gate outwardly.

A photographic unit P is preferably mounted as shown in Fig. 1 on a wall, as at 14, of the coop C adjacent either the entrance or exit gate, and is adapted to be operatively connected with said gate so as to photographically record on a film the number assigned to and carried by the hens using the nest N, in a corresponding sequence to the eggs in member 20.

In Fig. 1 I have shown said photographic unit operatively connected with the exit gate. The gate 13, as has been hereinbefore stated, is unlocked by the deposit of an egg in the receiver pocket 29, and the latch 31 which normally locks said gate is retained in its depressed position so long as an egg 23 is held in the pocket 29 of the receiver. Means, therefore, is provided for displacing the egg 23 from pocket 29 onto the channeled member 30 upon the opening of gate 13 by the movement of a hen therethrough. Said means includes an arm 50 fixed to the hinge rod 15 of gate 13 and extended inwardly into the coop C. Arm 50 is connected at 51 with a depending rod 52 which extends downwardly near one of the sides 53 of the coop C and is pivotally connected at 54 with an elongated arm 55 of a bell crank 56 (see Fig. 6) which has a short upwardly extended arm 57 near its axis.

The bell crank 56 is pivotally mounted at 58 on the wall 14 and the vertical arm 57 thereof is pivotally attached at 59 to the rear end 60 of a bar 61, as shown in Figs. 1 and 2. Said rod 61 is pivotally mounted at 62 on a bracket 63, and the rearward elongated portion thereof normally is at rest at the right hand margin of pocket 29, as seen in Fig. 2.

When a hen H emerges from the nest N and seeks egress through opening E', the movement of the hen through said opening elevates gate 13 and rotates rod 15 in a counterclockwise direction as seen in Fig. 1, thereby moving arm 50, rod 52 and arm 55 of bell crank 56 downwardly. The vertical arm 57 of bell crank 56, however, is moved to the left, as seen in Fig. 2, and correspondingly moves the portion 60 of rod 61 while the elongated inner portion of said rod 61 is moved in a counter-clockwise direction, as seen in Fig. 2. The elongated portion of rod 61 therefore engages and displaces the egg 23 from pocket 29 into the channel of member 30, whereupon the weight 27 becomes effective for restoring the receiver 22 to normal position with its egg receiving pocket 29 disposed immediately below and forwardly of the outlet 2.

Simultaneously with the restoration of receiver 22 to normal position, the latch 48 for gate 7 is retracted so as to permit the opening of said gate outwardly, and the latch 31 for gate 13 is extended upwardly so that upon complete emergence of the hen from contact with the gate, said latch may be swung pivotally against its spring to permit the gate to pass behind the latch and lock the gate against further opening outwardly.

The movement of the hen from the nest N permits a restoration of the bed 1 to its uppermost position, thereby elevating the portion 11 of member 12 to a position above the latch 10 on gate 7, thereby permitting the opening of gate 7 inwardly.

The photographic unit P is in effect a simple magazine camera including an objective 64 mounted in the bottom wall 65 of a suitable case 66. A film 67 is movably mounted behind the objective 64 on and is operatively connected with a dispensing reel 68 and a receiving reel 69. A shutter 70 is suitably mounted behind the objective 64 within or on a member 71. The hinge rod 15 of gate 13 is operatively connected with and for operating shutter 70 for exposing successive portions of the film 67 at each opening of gate 13 and with film 67 for the purpose of advancing the film on the final opening movement of gate 13 subsequent to each exposure.

The unit P is suitably mounted on a bracket 72 attached to a wall, as at 14, of the coop. An arm 73 is fixed to rod 15 at one side of the camera 66, and is slidably connected with a rod 74 which has a nut or head 75 on its rear end. Said rod 74 is connected at 76 with a lever 77 which is pivotally held at 78 on the camera case 66 and may have an inner extension 79 which is connected with or engages an arm 80 radially extended from the shutter 70.

A suitable film actuating means is provided within the camera casing 66 and may include a sprocket 81 pivotally mounted at 82 so that the teeth thereof will engage the usual perforations in the film 67, and a pawl 83, which is pivotally mounted at 84 on an arm 85 adapted to swing on the axis 82 of said sprocket and held in engagement with the teeth of said sprocket or a ratchet associated therewith by means of a spring 86.

The outer extremity of arm 85 is loosely connected with a portion 87 of an arm 88 which is pivotally held at 89 on the top of case 66. Said arm 88 has an extension 90 which projects outwardly through a slot 91 in the side of case 66, and is resiliently connected with the upper extremity of arm 73 by means of a spring 92. In a similar manner the arm 77 projects through a slot 93 near the bottom of the case 66. Thus as the hen H emerges from the coop C the initial opening of gate 13 will operate the film actuating mechanism and move an unexposed portion of film 67 into position for exposure through the objective lens 64.

The final opening movement of gate 13 will cause the intermediate portion of arm 73 to engage the nut or head 75 on arm 74 and operate shutter 70 for effecting an exposure at a time when the body of the hen is immediately below the lens 64. Any excess movement of arm 73 over and above that required for operating the film actuating mechanism in order that the shutter may be subsequently operated is compensated for by the tensioning of spring 92.

In order that a separate record of the production of a number of hens may be maintained, a separate number, letter, character or symbol 94 formed on a tag, label, or the like, may be affixed to the back or one of the wings of each hen and an exposure of the film 67 is made of each of such numbers in succession.

In the form of apparatus shown in Fig. 1 a record of the successive eggs laid by a given hen may be separately maintained on the film 67 while the eggs 23 in the order in which they were laid are held in a row in the channeled member 30. Thus the number of eggs laid by each hen is readily determined by the development of one or more of the films 67.

Where records are kept of pedigreed fowls, separate nests may be assigned to several hens and individual records kept of the eggs laid by such hens.

In the consideration of this invention it will be understood that I do not limit myself in the use of my apparatus to the recording of egg production, inasmuch as it will be readily apparent that a photographic unit associated with an operating member disposed in the path of a moving object or being may be useful in recording the passage of people, cattle, sheep, and other animate beings, as well as inanimate objects, by a given point.

Accordingly, the invention may be otherwise modified from the forms shown herein within the scope of the appended claims without departing from the spirit of my invention.

What I claim is:

1. An apparatus for recording the egg production of hens comprising: an enclosed coop having an opening, a gate normally locked against egress from the nest and forming a closure for said opening, a photographic unit mounted adjacent a margin of said opening and operable by said gate when it is opened by the passage of a hen through said opening, for photographically recording a number, symbol, or character affixed to the body of the hen within the range of said photographic unit, and means rendered operative by the deposit of an egg in said coop for unlocking said gate to permit the egress of a hen from the nest.

2. An apparatus for recording the production of hens, comprising: an enclosure having separate entrance and exit openings, a nest in said enclosure, an inwardly openable gate in said entrance opening to permit the ingress of a hen to the nest and adapted to be locked against opening inwardly by the presence of a hen on the nest, an outwardly openable gate in said exit opening normally locked against but arranged to permit the egress of a hen from the nest, means rendered operative by the deposit of an egg in the nest for locking said entrance gate against egress and for unlocking said exit gate to permit the egress of a hen, and a photographic recording unit arranged at a margin of said exit opening and operatively connected with said exit gate for recording a number or character carried by the hen, said exit gate being opened by a hen when it emerges from the nest.

3. An apparatus for recording the production of hens, comprising: an enclosure having separate entrance and exit openings, a nest therein, a gate normally openable inwardly in said entrance opening to permit the ingress of a hen to the nest and locked against ingress when a hen is on the nest, an outwardly openable gate in said exit opening normally locked against but arranged to permit the egress of a hen from the nest, means rendered operative by the deposit of an egg in the nest for locking said entrance gate against agress and for unlocking said exit gate to permit the egress of a hen, and a photographic recording unit arranged at a margin of said exit opening and operatively connected with said exit gate for recording a number or character carried by the hen, said exit gate being opened by a hen when it emerges from the nest, said means being operative for retaining said exit gate unlocked subsequent to the deposit of an egg in the nest and until said exit gate has been completely opened by the emergence of a hen from said exit opening.

4. An apparatus for recording the egg production of hens, comprising: an enclosure having an entrance and an exit opening and a nest therein, a gate forming a closure for each of said openings, said entrance gate being normally openable inwardly to permit ingress of a hen to the nest, said nest being depressed by the presence of a hen thereon and rendered operative by the entrance of a hen to the nest for locking said entrance gate against the further inward opening while the hen is on said nest, said exit gate being openable outwardly by the egress of a hen through said exit, and a photographic recording unit mounted externally of said exit and operatively connected with said exit gate to photographically record a number or character worn on the body of a hen emerging from the nest.

5. An apparatus for recording the egg production of hens, comprising: an enclosure having an entrance and an exit opening, a nest therein, a gate forming a closure for each of said openings, said entrance gate being normally openable inwardly to permit ingress of a hen to the nest, said nest being yieldable with the hen thereon and operative for locking said entrance gate against the further inward opening while the hen is on said nest, said exit gate being openable outwardly to permit the egress of a hen through said exit, a photographic recording unit mounted above said exit opening and operatively connected with said exit gate to photographically record a number or character worn on the back of a hen emerging from the nest, means for normally locking said exit gate against opening, and means rendered operative by the deposit of an egg in said nest for maintaining said exit gate in an unlocked condition, until said photographic recording unit has been operated.

6. An apparatus for recording the egg production of hens comprising: an enclosure having separate entrance and exit openings, a nest therein, a gate forming a closure for each of said openings, said exit gate being normally locked against opening, a photographic unit operatively connected with the exit gate and adapted to be operated when and as said exit gate is opened by the exit of a hen from the nest, and means associated with said nest and operable upon deposit of an egg in said nest for locking said entrance gate against opening, and for unlocking said exit gate and maintaining said gate in an unlocked condition, until the completion of the operation of said photographic unit for recording the number or character worn by a laying hen.

7. An apparatus for recording the egg production of hens, comprising: an enclosure having entrance and exit openings, a nest therein, gates forming closures for said openings, means for normally locking said exit gate against egress of a hen through said exit opening, a photographic unit adjacent said opening and operatively connected with said gate, and means rendered operative by the deposit of an egg in said nest for unlocking and holding said exit gate unlocked until the completion of an operation of said photographic unit for recording a number or character worn by a laying hen.

8. An apparatus of the character described, comprising: an enclosure having an entrance and an exit, a nest therein, separate gates forming closures for said entrance and said exit, a photographic unit adjacent said exit and operatively connected with the exit gate, said nest having an opening to permit the passage of an egg therethrough, a yieldable receiver for locking the entrance gate against outward opening and unlocking the exit gate mounted below said opening, separate locks for said gates operatively connected with said receiver, means associated with said nest and operable upon the entry of a hen thereto for locking said entrance gate against inward opening, and means operatively connected with said exit gate for displacing an egg from said receiver, the restoration of said receiver to normal position serving to unlock said entrance gate and to relock said exit gate.

9. An apparatus for recording the egg production of hens comprising: an enclosure having entrance and exit openings, closures therefor adapted to be held against egress and entrance respectively, a photographic recording unit operatively connected with said exit closure for recording numbers, symbols or the like worn on the bodies of the hens as said exit closure is opened to passage of the hens therethrough, a nest in said enclosure having an outlet for eggs deposited thereon, means permitting the passage of a hen from the exit opening only after the hen lays an egg, including a member which moves when the egg is deposited therein from said outlet, latches controlling said closures, and means of connection between said latches and said movable member, and means adjacent said member for receiving eggs in succession as they are laid, whereby the photographic records and the laid eggs may be retained in corresponding sequence so that the egg producing hens may be identified with the laid eggs.

10. An apparatus for recording the egg production of hens comprising: an enclosure having entrance and exit openings, closures therefor adapted to be held against egress and entrance respectively, a photographic recording unit operatively connected with said exit closure for recording numbers, symbols or the like worn on the bodies of the hens as said closure is opened to passage of the hens therethrough, a nest in said enclosure, means for permitting the passage of a hen from said nest through the exit only after an egg is laid and including an egg receiver and a channel member and connections between said receiver and said exit closure operable by the deposit of an egg in said receiver, said egg moving from said receiver to said channel member, whereby the photographic records and the laid eggs may be retained in corresponding sequence so that the hens may be identified with the laid eggs.

ORLANDO E. KELLUM.